United States Patent
Kim et al.

(10) Patent No.: US 8,395,064 B2
(45) Date of Patent: Mar. 12, 2013

(54) INTERLOCK APPARATUS OF GROUND SWITCH FOR VACUUM CIRCUIT BREAKER

(75) Inventors: Dae Sung Kim, Chungcheongbuk-Do (KR); Keun Eui Kim, Daejeon (KR)

(73) Assignee: LS Industrial Systems Co., Ltd., Anyang, Gyeonggi-Do (KR)

( * ) Notice: Subject to any disclaimer, the term of this patent is extended or adjusted under 35 U.S.C. 154(b) by 154 days.

(21) Appl. No.: 12/975,217

(22) Filed: Dec. 21, 2010

(65) Prior Publication Data

US 2011/0147172 A1 Jun. 23, 2011

(30) Foreign Application Priority Data

Dec. 23, 2009 (KR) .................. 10-2009-0130190

(51) Int. Cl.
*H01H 9/00* (2006.01)
(52) U.S. Cl. .................................... 200/50.21
(58) Field of Classification Search .................. 200/308, 200/50.26, 400, 401, 50.21, 50.22–50.25
See application file for complete search history.

(56) References Cited

U.S. PATENT DOCUMENTS

| | | | | |
|---|---|---|---|---|
| 6,884,949 | B2* | 4/2005 | Yoon | 200/50.26 |
| 8,222,552 | B2* | 7/2012 | Kim et al. | 200/308 |
| 8,294,051 | B2* | 10/2012 | Park et al. | 200/50.21 |
| 2010/0230257 | A1* | 9/2010 | Kim et al. | 200/50.25 |

FOREIGN PATENT DOCUMENTS

| | | |
|---|---|---|
| JP | 55-178211 | 6/1979 |
| JP | 57-31010 | 7/1980 |
| JP | 2000341812 | 12/2000 |
| JP | 2006081267 | 3/2006 |
| JP | 2008131818 | 6/2008 |

OTHER PUBLICATIONS

In the Japanese Patent Office Application Serial No. 2010-286560, Office Action dated Oct. 9, 2012, 3 pages.

* cited by examiner

*Primary Examiner* — Edwin A. Leon
(74) *Attorney, Agent, or Firm* — Lee, Hong, Degerman, Kang & Waimey (57) ABSTRACT

Provided herein is an interlock apparatus for preventing the drawing-in or drawing-out of a vacuum circuit breaker main body in interlock with the ground operation of a ground switch in a vacuum circuit breaker, and the ground switch interlock apparatus of the vacuum circuit breaker comprising: a drive spindle; a movable plate movable to a manipulation handle connection allowance position or a manipulation handle connection prohibition position; a first interlock plate that moves the movable plate to the manipulation handle connection allowance position or the manipulation handle connection prohibition position; and a second interlock plate to be moved to a position for locking the first interlock plate at the manipulation handle connection prohibition position when the ground switch is at a ground position and a position for releasing from the restraint of the first interlock plate when the ground switch is not at the ground position.

11 Claims, 5 Drawing Sheets

INTERLOCK APPARATUS OF GROUND SWITCH FOR VACUUM CIRCUIT BREAKER

CROSS-REFERENCE TO A RELATED APPLICATION

Pursuant to 35 U.S.C. §119(a), this application claims the benefit of earlier filing date and right of priority to Korean Application No. 10-2009-0130190, filed on Dec. 23, 2009, the contents of which is incorporated by reference herein in its entirety.

BACKGROUND OF THE INVENTION

1. Field of the Invention

The present invention relates to a vacuum circuit breaker, and more particularly, to an interlock apparatus for preventing (prohibiting) a main body of the vacuum circuit breaker from being drawn out or drawn in when the ground switch of the vacuum circuit breaker is located at a ground position.

2. Description of the Conventional Art

Typically, a vacuum circuit breaker is an electric power device mounted in a circuit breaker chamber of the switchgear (i.e., in other words electric power distributing board) to connect a primary side (electric power receiving side) circuit with a secondary side (electric power distributing side) circuit, thereby allowing a normal current conduction to supply electric power to load-side devices in normal times. Also, the vacuum circuit breaker is an electric power device for breaking the electric circuit to protect electric power lines and load devices when a fault current such as a short circuit current occurs, and handling high voltages above several thousand kilovolts or ultra-high voltages above several tens of thousand kilovolts.

In addition, the vacuum circuit breaker is configured with a structure that a circuit breaker main body can be moved to a drawing-in position where it is connected to the electric circuit and a drawing-out position where it is separated from the circuit, within the circuit breaker chamber. In other words, it is configured such a manner that the circuit breaker main body can be drawn out with only simple manipulation when performing the maintenance of the vacuum circuit breaker, and also the circuit breaker main body can be simply moved to the drawing-in position when completing the maintenance. For the detailed construction and operation for drawing in or out such a drawing-out type vacuum circuit breaker, it may be possible to refer to the disclosure of Korean Grant Patent No. 10-0324492 (Title of the invention: Device for transferring movable unit of circuit breaker) which is filed and registered by the applicant of the present invention.

On the other hand, the operation for discharging a current charged on the secondary side (load-side) conduction portion on the circuit is necessarily required to protect an operator from the safety accidents of electric shock when implementing the maintenance of the circuit breaker main body. The technologies for discharging the charged current have been developed from the prior art in which a user directly discharges the current charged on each phase conductive portion of the three-phases alternate current using the ground rod to a technology in which the charged three-phases currents can be discharged at the same time by using an ground switch. Accordingly, while discharging the ground, it is used a ground discharging method using an ground switch capable of minimizing a power failure time during the maintenance and securing the user's safety, and the ratio of switchgears (distributing board panels) using such a technology has been increased. For the construction and operation of an ground switch for providing a concurrent three-phases automatic grounding function disclosed herein, it may be possible to refer to the disclosure of Korean Grant Patent No. 10-0505053 (Title of the invention: Toggle-type ground switch for a multi pole circuit breaker) which is filed and registered by the applicant of the present invention.

There is a function that should be necessarily secured when applying such a structure, which is a function for preventing the circuit breaker main body from being driven at the ON position by moving it to the drawing-in position in a state that an ground switch for discharging secondary-side charged current in a circuit (namely, at the ground position) is on. If electric power source is applied to the circuit when the circuit breaker is on in a state that the secondary-side (load-side) circuit is connected to the ground, then it may result in a ground fault, thereby causing enormous damage. As a result, it is required an interlock apparatus in which the ON manipulation of the ground switch and the drawing-in position movement manipulation of the circuit breaker are interlocked to prohibit (prevent) the operation.

SUMMARY OF THE INVENTION

Accordingly, an aspect of the present invention is to provide a ground switch interlock apparatus of a vacuum circuit breaker for prohibiting a handle driving and manipulating a drawing-in/out drive spindle from being driven and connected to prevent the drawing-in or drawing-out of the circuit breaker main body when the installed ground switch is at a ground position in a switchgear integrated with a vacuum circuit breaker.

The objective of the present invention may be accomplished by providing a ground switch interlock apparatus of a vacuum circuit breaker to be interlocked with ground switches of the vacuum circuit breaker for transferring the rotational torque of a ground operating shaft to drive three-phases ground switches to the ground position at the same time, the apparatus comprising:

a drive spindle for drawing in or out a main body of the vacuum circuit breaker;

a movable plate provided with a connection hole of a manipulation handle for rotating the drive spindle to be moved to a manipulation handle connection allowance position for allowing the manipulation handle to be connected to the drive spindle or a manipulation handle connection prohibition position for prohibiting the manipulation handle to be connected to the drive spindle;

a first interlock plate connected to the movable plate to be movable to move the movable plate to the manipulation handle connection allowance position or the manipulation handle connection prohibition position; and a second interlock plate to be movable to a lock position for locking the first interlock plate at the manipulation handle connection prohibition position or a releasing position for releasing the first interlock plate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The objective of the present invention, as well as the configuration and working effect thereof to accomplish the foregoing objective will be clearly understood by the following description for the preferred embodiments of present invention with reference to the accompanying FIGS. 1 through 5.

Figure 1:
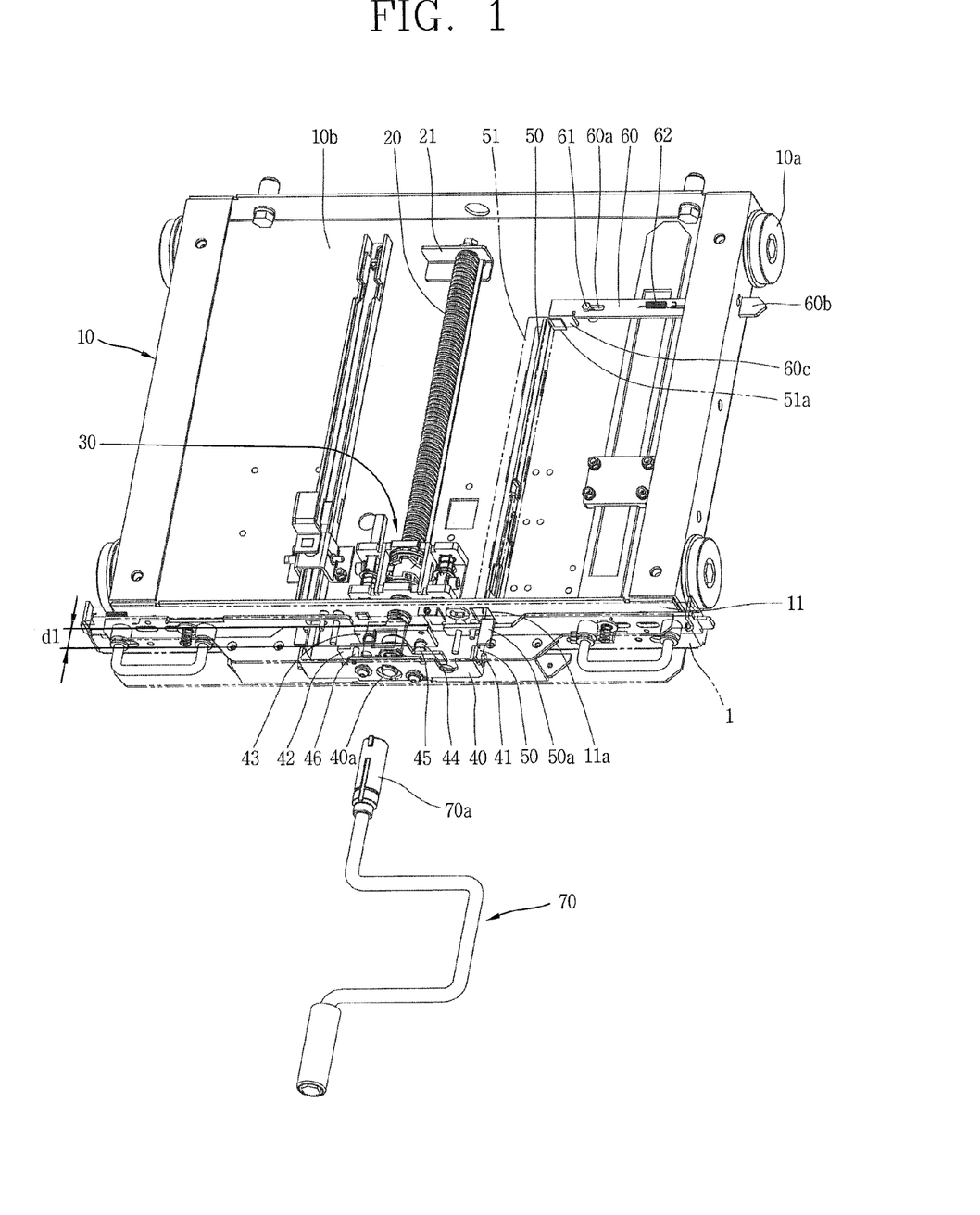
FIG. 1 is a perspective view illustrating the configuration of a ground switch interlock apparatus of a vacuum circuit breaker according to a preferred embodiment of the present invention, in which a manipulation handle is not connected to a spindle when the ground switch is not at a ground position.
Figure 2:
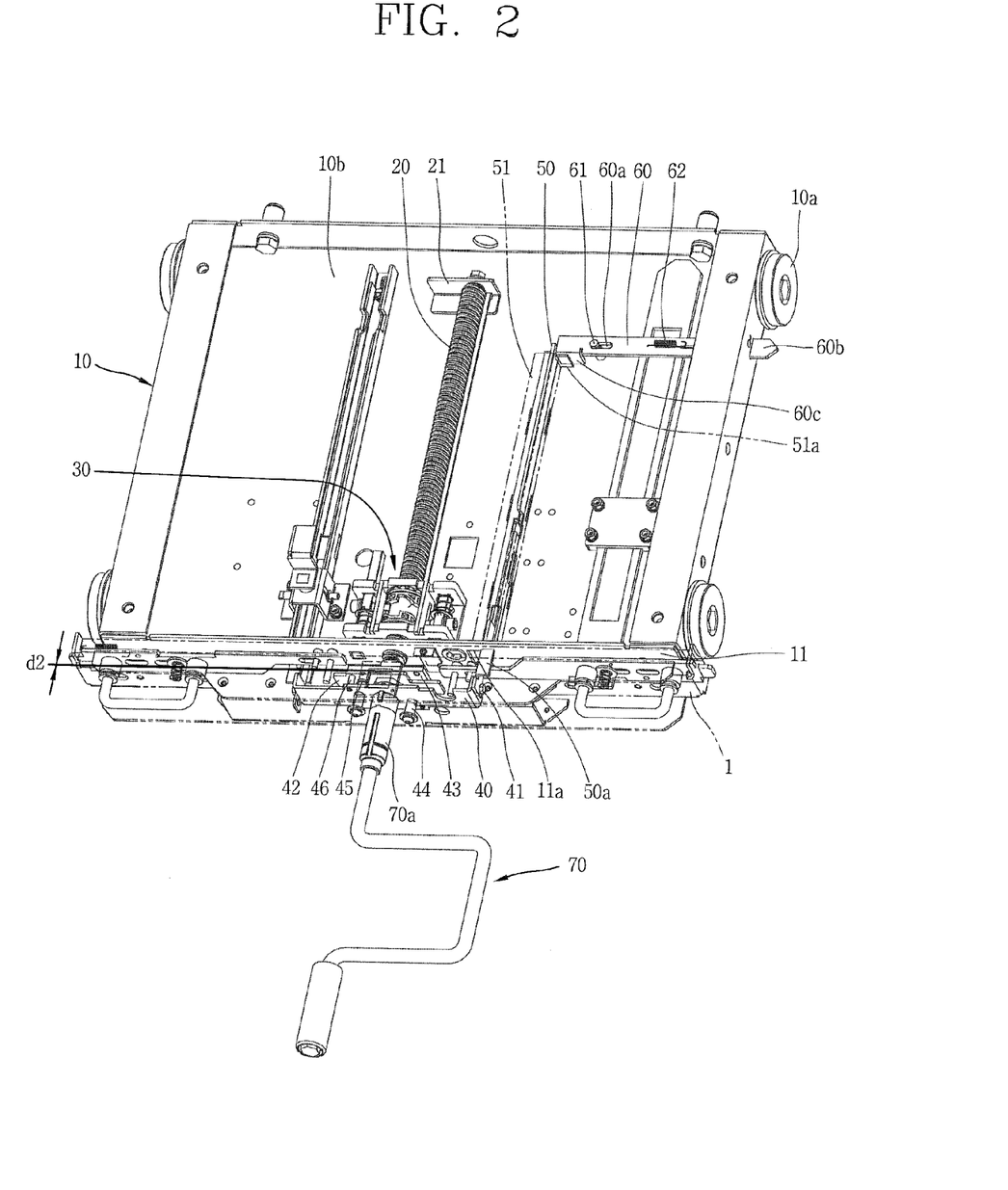
FIG. 2 is a perspective view illustrating the configuration of a ground switch interlock apparatus of a vacuum circuit breaker according to a preferred embodiment of the present invention, in which a manipulation handle is connected to a spindle when the ground switch is not at a ground position.
Figure 3:
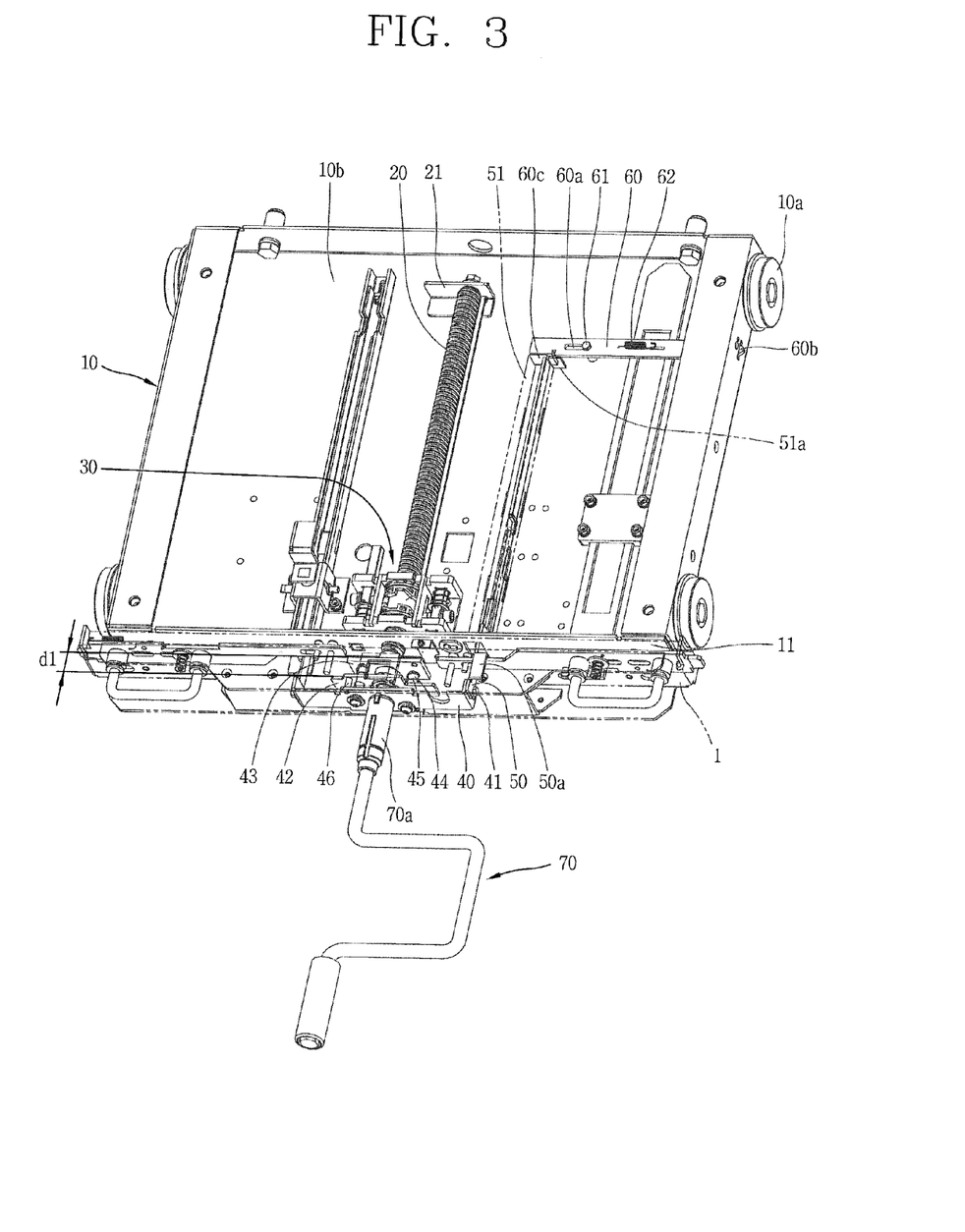
FIG. 3 is a perspective view illustrating the configuration of a ground switch interlock apparatus of a vacuum circuit breaker according to a preferred embodiment of the present invention, in which the location of a ground switch interlock apparatus is shown and a manipulation handle is attempted to be connected to a spindle when the ground switch is at a ground position.

A ground switch interlock apparatus of a vacuum circuit breaker according to a preferred embodiment of the present invention comprises a drive spindle 20, a movable plate 40, a first interlock plate 50, and a second interlock plate 60, as illustrated in FIGS. 1 through 3.

Figure 4:
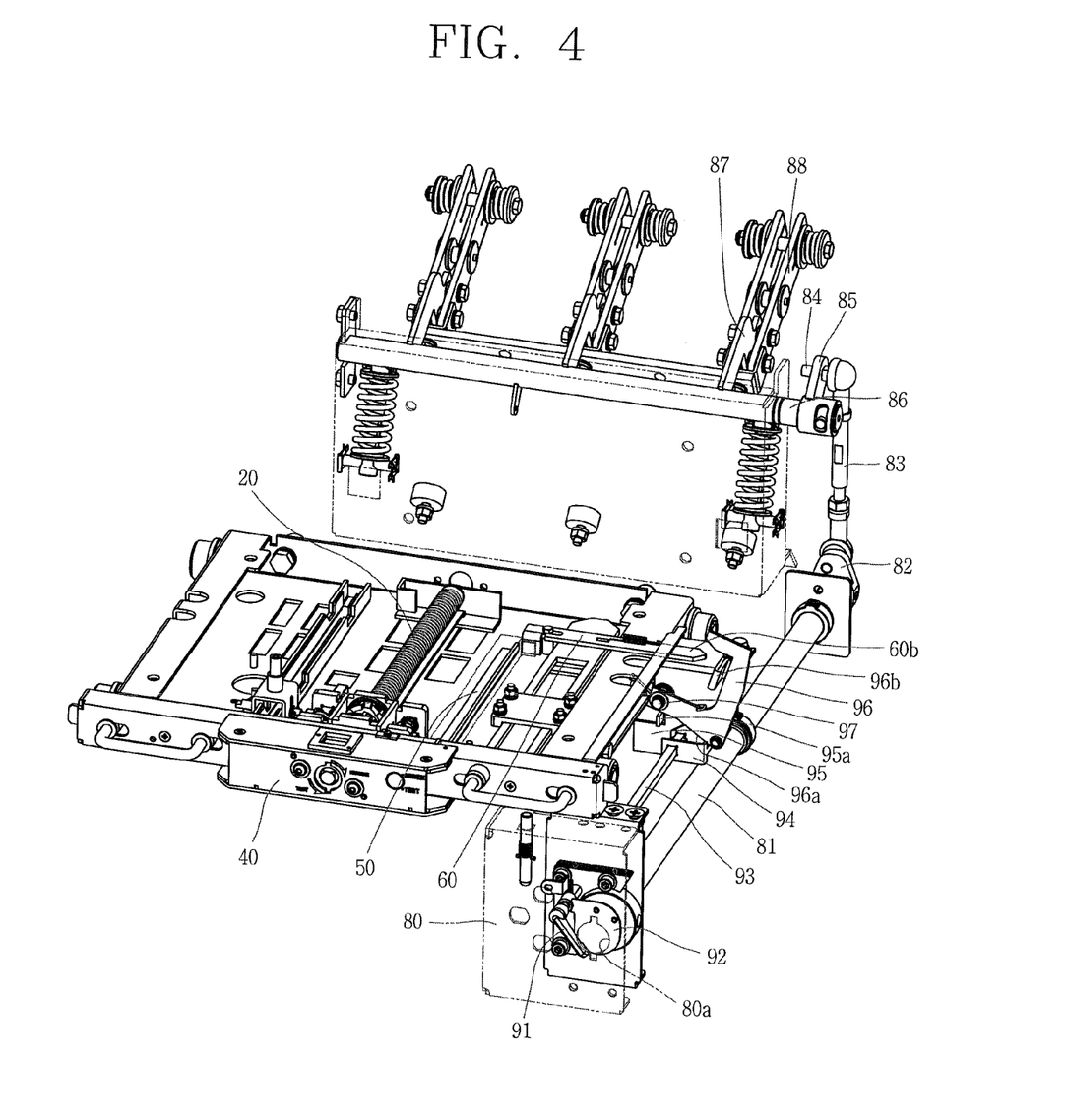
FIG. 4 is an operation state perspective view illustrating the system configuration of an overall ground switch interlock apparatus including a ground switch and an interlock operating mechanism in a ground switch interlock apparatus of a vacuum circuit breaker according to a preferred embodiment of the present invention, in which the interlock operating mechanism is not operated, a manipulation handle connection hole is shielded by a door plate to disable the connection of the handle of manipulating the ground switch, and a circuit breaker main body can be transferred to a drawing-in or drawing-out position.
Figure 5:
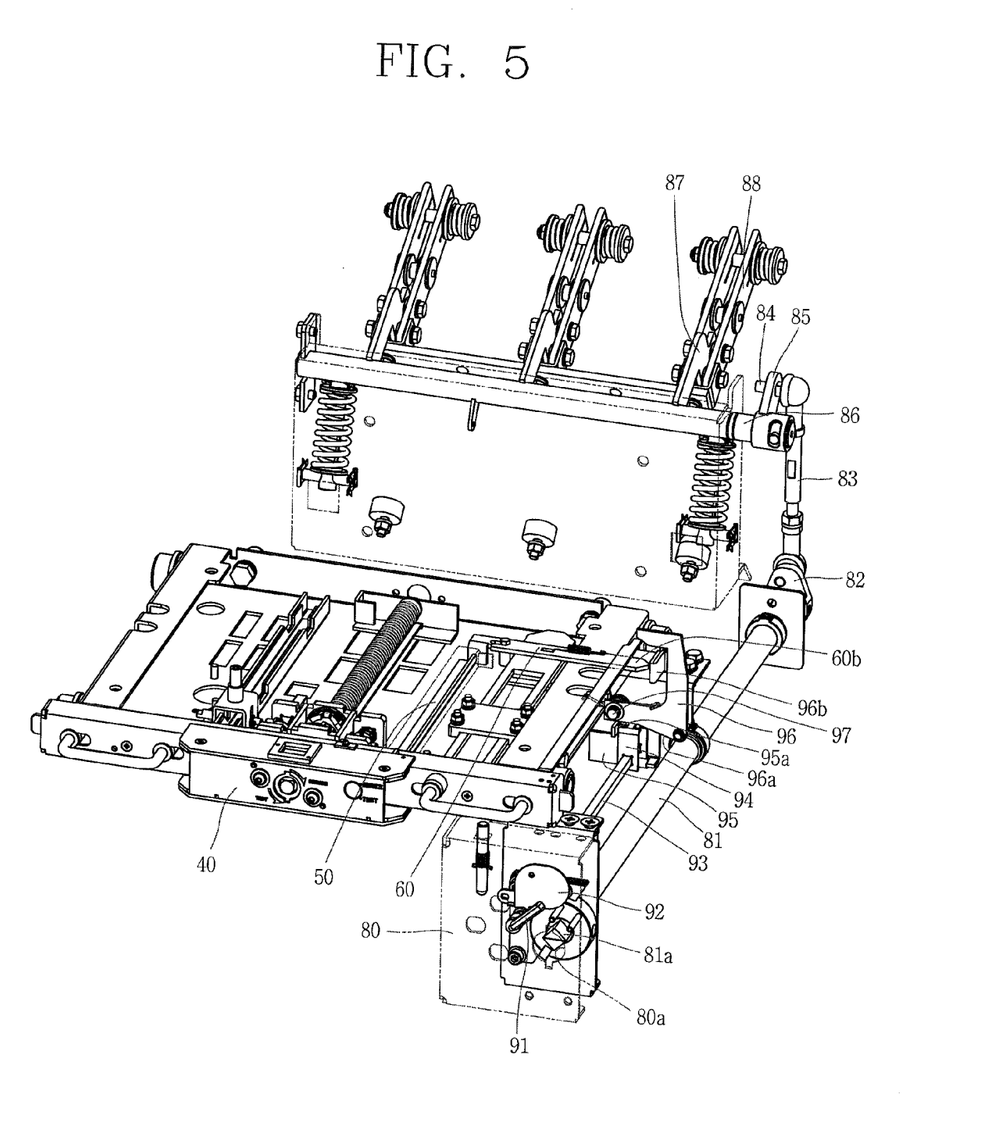
FIG. 5 is an operation state perspective view illustrating the system configuration of an overall ground switch interlock apparatus including a ground switch and an interlock operating mechanism in a ground switch interlock apparatus of a vacuum circuit breaker according to a preferred embodiment of the present invention, in which the interlock operating mechanism is operated, a manipulation handle connection hole is opened by a door plate to enable the connection of the handle of manipulating the ground switch, and a circuit breaker main body cannot be transferred to a drawing-in or drawing-out position.

In addition, the ground switch interlock apparatus of a vacuum circuit breaker according to a preferred embodiment of the present invention may further comprise an interlock operating mechanism 91, 92, 93, 94, 95, 96, as illustrated in FIGS. 4 and 5.

First, referring to FIGS. 4 and 5, the configuration of a ground switch actuating mechanism and the configuration of the interlock operating mechanisms 91, 92, 93, 94, 95, 96 will be described as follows.

The ground switch actuating mechanism comprises a ground operating shaft 81, a cam 82, a rod 83, a link pin 84, a first arm 85, a main shaft 86, a second arm 87, and a ground switch 88. The ground switch actuating mechanism may further comprise a ground switch operating panel 80 for allowing the user to access the ground switch actuating mechanism. On a front plate of the ground switch operating panel 80, it is exposed a handle connection end portion 81a of the ground operating shaft 81. On a front plate of the ground switch operating panel 80, it is also provided a manipulation handle connection hole 80a for allowing the connection of the manipulation handle (not shown in drawing, but the manipulation handle illustrated reference numeral 70 in FIGS. 1 through 3 may be commonly used).

The ground operating shaft 81 is a rotation shaft provided to be extended from the manipulation handle connection end portion 81a exposed on a front plate thereof to the rear side. For the ground operating shaft 81, the cross section of the manipulation handle connection end portion 81a has a rectangular cross-sectional view for non-slippery connection of the manipulation handle. The remaining portion of the ground operating shaft 81 may be configured with a circular metal rod.

The cam 82 for converting the rotational movement of the ground operating shaft 81 to the linear movement thereof is supported at a rear end portion of the ground operating shaft 81. A portion of the cam 82, opposite to the portion by which the ground operating shaft 81 is supported, is connected to a lower portion of the rod 83 by a connecting means such as a connecting pin.

The rod 83 linearly moves to be lifted up and down according to the rotation of the cam 82. The main shaft 86 is connected to an upper portion of the rod 83 by the link pin 84 and the first arm 85.

An end portion of the main shaft 86 (right end portion in FIGS. 4 and 5) is connected to the first arm 85 by a connection method, such as welding, to be rotated together with the main shaft 86. An end portion of the first arm 85 is connected to the rod 83 by the link pin 84. As a result, as the rod 83 is lifted up and down, the first arm 85 and the main shaft 86 will be rotated in a counter-clockwise or clockwise direction.

On an axis of the main shaft 86, three second arms 87 are provided to be extended in a perpendicular direction at regular intervals to correspond to the three-phases alternate currents with respect to an axial direction of the main shaft 86.

Each of the second arms 87 is connected to three ground switches 88 at predetermined intervals to correspond to the three-phases alternate currents, respectively, by a connecting means such as a bolt and nut. As a result, the three second arms 87 and the three ground switches 88 will be rotated together in the same direction by the rotation of the main shaft 86.

The ground switches 88 allows the remaining current charged at a load-side of the circuit to be discharged to the earth when connected to the ground portion which is not illustrated in the drawing.

On the other hand, the configuration of the interlock operating mechanism 91, 92, 93, 94, 95, 96, 97 will be described with reference to FIGS. 4 and 5.

The interlock operating mechanism 91, 92, 93, 94, 95, 96, 97 comprise a actuating shaft 93 to be rotated by an motorized or manual driving torque and a power conversion mechanism 94, 95, 96, 97 driven and connected to the operating shaft 93 to convert a rotational torque of the actuating shaft 93 to a linear torque pushing the second interlock plate 60.

According to a preferred embodiment of the present invention, the actuating shaft 93 may be configured with a metal rod having a rectangular cross-sectional view and a predetermined length. The actuating shaft 93 is provided to be extended to a rear side of the ground switch operating panel 80 in parallel to the operating shaft 81 of the ground switch actuating mechanism.

According to a preferred embodiment of the present invention, the interlock operating mechanism 91, 92, 93, 94, 95, 96, 97 may further include an interlock plate operating lever 91, and a door plate 92.

The interlock plate operating lever 91 is a means for allowing the user to manually actuate the actuating shaft 93, thereby driving the ground switch interlock apparatus of a vacuum circuit breaker according to the present invention to a position allowing or prohibiting the drawing-in or drawing-out position of the circuit breaker main body. The interlock plate operating lever 91 is configured with a lever connected to a front end portion of the actuating shaft 93 and extended by a predetermined length in a perpendicular direction with respect to an axial direction of the actuating shaft 93, thereby allowing the user to grip and rotatably actuate in a clockwise or counter-clockwise direction.

The door plate 92 is configured with a plate connected to an axis of the actuating shaft 93 by welding or a connecting member, such as a connecting pin, to be rotated together with the actuating shaft 93. Furthermore, the door plate 92 is located between a manipulation handle connection hole 80a on a front plate of the operating panel 80 and a handle connection end portion 81a of the operating shaft 81 at a rear side thereof. The door plate 92 is supported by the actuating shaft 93 to be rotated to a position allowing the access of the manipulation handle to open the manipulation handle connection hole 80a and a position prohibiting the access of the manipulation handle to close the manipulation handle connection hole 80a with respect to the ground operating shaft 81 according to the rotation position of the actuating shaft 93. The shape of the door plate 92 is not limited to a specific shape and may be sufficient with a plate member having a size and/or area capable of opening or closing the manipulation handle connection hole 80a according to the rotation position of the actuating shaft 93.

The power conversion mechanism 94, 95, 96, 97 may include a lever plate 94 and an interlock lever 96. The power conversion mechanism 94, 95, 96, 97 may further include a supporting plate 95 and a pivot shaft 97.

The lever plate 94 is a metal plate material supported by the actuating shaft 93 to be rotated according to the rotation of the actuating shaft 93, for instance, and the lever plate 94 may be configured with a substantially "U"-shaped plate material according to a preferred embodiment of the present invention. When the user rotates the interlock plate operating lever 91 of the actuating shaft 93 in a counter-clockwise direction in the drawing to actuate the ground switch 88 to a ground position, the lever plate 94 is in a vertically erected position. When the user rotates the ground switch 88 from the ground position to a non-ground position to locate it to its original position and then rotates the interlock plate operating lever 91 of the actuating shaft 93 in a clockwise direction in the drawing to a position where the door plate 92 closes the manipulation handle connection hole 80a, the lever plate 94 is in a horizontally laid position.

The interlock lever 96 is positioned within a rotation locus of the rotating lever plate 94 to be pushed and rotated by the rotating lever plate 94, and has a portion being linearly moved along the rotation. More specifically, the interlock lever 96 may be configured with a substantially laid "U"-type metal plate material, and a bottom surface (lower surface) 96a of the interlock lever 96 is a power receiving surface being pressed by the rotating lever plate 94 to receive rotational driving torque. A lower end portion of the interlock lever 96 is supported by the pivot shaft 97 to rotate the interlock lever 96 using the pivot shaft 97 as a pivot. The interlock lever 96 may include a pressing plate portion 96b at one side of the upper portion thereof that is slantly moved in a lateral direction to the left or right side in FIGS. 4 and 5 according to the rotation of the interlock lever 96, pressing and pushing the second interlock plate 60 or being separated and retracted from the second interlock plate 60.

The supporting plate 95 included in the power conversion mechanism 94, 95, 96, 97 is a plate for rotatably supporting the interlock lever 96 through the rotation supporting shaft 97, and the rotation supporting shaft 97 is fixed and supported to the supporting plate 95. For the supporting plate 95, as illustrated in FIG. 5, a first stopper portion 95a and a second stopper portion 95b are provided at a position contacted in a state of the lever plate 94 being erected and a position contacted in a state of the lever plate 94 being laid in a rotation locus of the lever plate 94, respectively. The first stopper portion 95a and the second stopper portion 95b may be formed by cutting and bending the relevant portion of the supporting plate 95. The rotation of the lever plate 94 in a counter-clockwise direction in the drawing may be limited to be stopped in the erected state by the first stopper portion 95a, and the rotation of the lever plate 94 in a clockwise direction in the drawing may be limited to be stopped in the laid state by second stopper portion 95b.

On the other hand, referring to FIGS. 1 through 3, the configuration of a drive spindle 20, a movable plate 40, a first interlock plate 50, and a second interlock plate 60 in a ground switch interlock apparatus of a vacuum circuit breaker according to a preferred embodiment of the present invention will be described as follows.

The drive spindle 20 is provided to draw in or out a main body (not shown) of the vacuum circuit breaker loaded on the movable carriage 10, and meshed with a corresponding nut of a nut assembly 30 which will be described later, and configured with a rod typically made of steel materials to be forwarded or retracted through the nut with reference to the nut, and a threaded surface thereof is formed on most of the circumferential surface of along a length direction of the rod. The main body (not shown) of the vacuum circuit breaker is a main circuit portion of the vacuum circuit breaker, which comprises a vacuum interrupter provided for each phase of the three-phases alternate current, a switching mechanism for switching a movable contactor of the vacuum interrupter, a trip mechanism for triggering the switching mechanism to be operated to a trip position, and the like, and it is well known and thus the detailed illustration and description thereof will be omitted not to obscure the subject matter of the present invention. A pressing plate 21 is connected and provided at a rear end portion of the drive spindle 20, and the pressing plate 21 is forwarded or retracted on a carriage bottom surface 10b of the movable carriage 10. The nut assembly 30 may include a clutch pin having a position being separated from an outer circumferential surface of the nut to idly rotate the drive spindle 20 and a position being connected to an outer circumferential surface of the nut to rotate the nut together with the drive spindle 20 or stop the nut and a return spring thereof. When the main body of the vacuum circuit breaker is at a drawing-in position being connected to a terminal of the corresponding cradle, in other words, when the drive spindle 20 is in a state of being retracted from the position illustrated in FIG. 1 and the movable carriage 10 being forwarded, the pressing plate 21 presses the relevant clutch pin to move it to a separated position, thereby operating the drive spindle 20 to be idly rotated. For the more detailed description and illustration for the construction and operation of the drive spindle 20, nut assembly 30, and pressing plate 21, it may be possible to refer to the disclosure of Korean Grant Patent No. 10-0324492 (Title of the invention: Device for transferring movable unit of circuit breaker) which has been described in the background of the present invention.

The movable plate 40 may be moved to a manipulation handle connection allowance position for allowing the manipulation handle 70 to be connected to the drive spindle 20 and a manipulation handle connection prohibition position for prohibiting the manipulation handle 70 to be connected to the drive spindle 20. Here, the position as illustrated in FIG. 2 may be referred to for the manipulation handle connection allowance position, and the position as illustrated in FIG. 3 may be referred to for the manipulation handle connection prohibition position. The movable plate 40 may be provided with a connection hole 40a to which a front end portion 70a of the manipulation handle 70 for rotating the drive spindle 20 is connected.

A front surface of the switchgear (in other words power distributing board) is provided with a girder assembly 1 fixably installed at a front surface of the switchgear as a means of allowing the access for connecting the manipulation handle 70 and supporting a front end portion of the manipulation handle 70, and the movable plate 40 can be moved to a position being approached to the girder assembly 1 or being apart from the girder assembly 1 with reference to the girder assembly 1.

The girder assembly 1 is fixably installed at a front surface of the switchgear (namely, distributing board panel), but on the contrary, the movable carriage 10 supporting the circuit breaker main body (not shown) can be moved to a position being approached to the girder assembly 1 or being apart from the girder assembly 1. In other words, by moving the movable carriage 10 to a position being approached to the girder assembly 1, the circuit breaker main body may separated from a terminal of the cradle for circuit connection being fixed at a rear side of the switchgear to be located at a drawing-out position. Otherwise, by moving the movable carriage 10 to a position being apart from the girder assembly 1, the circuit breaker main body may be located at a drawing-in position mechanically and electrically connected to a terminal of the cradle for circuit connection being fixed at a rear side of the switchgear. For the movement, the movable carriage 10 is configured with a top opened box-type body, and a pair of wheels 10a provided at both sides of the relevant body, respectively.

The first interlock plate 50 is connected to the movable plate 40, and may be moved in a forward or backward direction by a distance d1 in FIG. 3 to move the movable plate 40 to the manipulation handle connection allowance position or the manipulation handle connection prohibition position. Referring to FIGS. 1 through 3, a lengthwise end portion (right-side end portion in the drawing) of the movable plate 40 is connected to the first interlock plate 50 by a connecting screw 41. An other end portion (left-side end portion in the drawing) is made in a perpendicular direction from the movable plate 40, and connected to be extended into the movable carriage 10 through the girder assembly 1, and connected to a balance lever to which reference number is not assigned. An opening 11a into or out of which the first interlock plate 50 is allowed to be entered on a front plate 11 of the movable carriage 10 is provided at a position separated from a central portion through which the drive spindle 20 is penetrated in a lateral direction of the predetermined distance. For the first interlock plate 50, a front portion close to the movable plate 40 is formed with a straight plate portion which is vertically erected to be easily entered in or out through the opening 11a of the front plate 11 of the carriage. However, for the non-slanted balanced in-and-out movement of the first interlock plate 50, the remaining length portion of the first interlock plate 50 has an "L"-shaped longitudinal cross-section at which a horizontal plate portion is formed to be extended at the vertically erected straight plate portion. Furthermore, for the first interlock plate 50, a latch portion 50a, which is latched by the peripheral portion of the opening 11a on the front plate 11 of the carriage to restrict the movement of the first interlock plate 50, is provided at the vertically erected straight plate portion formed at the front end portion to be extended in a horizontal direction from an upper portion of the straight plate portion.

In order to safely guide the in-and-out movement of the first interlock plate 50, a guide rail 51 is provided fixedly on a bottom surface 10b of the movable carriage 10 in an in-and-out movement direction of the first interlock plate 50, in other words, in a length direction of the movable carriage 10, with a predetermined length. The guide rail 51 may be configured with a plate member, a lower portion of which is opened with a substantially "U" shape according to an embodiment of the present invention. An extension plate portion 51a is provided at a rear end portion of the guide rail 51 to be extended from the guide rail 51 to a side of the front end portion 60b of the second interlock plate 60.

A ground switch interlock apparatus of a vacuum circuit breaker according to a preferred embodiment of the present invention may further include a stopper means for restricting the movement of the first interlock plate 50 to a rear side. The stopper means may include a peripheral portion of the opening 11a into or out of which the first interlock plate 50 is entered on a front plate 11 of the movable carriage 10 supporting the main body of the vacuum circuit breaker to be transferred to a drawing-in position or drawing-out position, and a latch portion 50a formed to be extended from the first interlock plate 50 and latched by the peripheral portion of the opening 11a to restrict the movement of the first interlock plate 50.

The second interlock plate 60 can be moved to a position for locking the first interlock plate 50 at the manipulation handle connection prohibition position (in other words, a position where the first interlock plate 50 is drawn out of the movable carriage 10 to be restrained in a retractably moved state) when the ground switch 88 is at a ground position or a position for releasing from the restraint of the first interlock plate 50 (in other words, a position where the first interlock plate 50 is drawn into the movable carriage 10 and released to be moved forward) when the ground switch 88 is not at the ground position. The movement of the second interlock plate 60 to a locking position or releasing position is accomplished by laterally moving the second interlock plate 60 to a left or right side thereof. On the contrary, the first interlock plate 50 can be moved in a forward or backward direction on the movable carriage 10. The second interlock plate 60 may be configured with a metal rod member having a substantially flat plate shape according to a preferred embodiment of the present invention. The second interlock plate 60 is entered in or out through an gateway formed at a sidewall of the movable carriage 10. The second interlock plate 60 may have a front end portion 60b located to be protruded from the sidewall of the movable carriage 10 in normal times. The front end portion 60b may have a pointed front shape to be adapted to receive applied pressure by a plate surface of the pressing plate portion (see reference numeral 96b in FIGS. 4 and 5) of the driving mechanism (which will be described later with reference to FIGS. 4 and 5).

A return spring 62 is provided between the second interlock plate 60 and the carriage bottom surface 10b of the movable carriage 10. An end portion of the relevant return spring 62 is connected and supported to the carriage bottom surface 10b of the movable carriage 10 and the other end portion thereof is connected to and supported by the second interlock plate 60. The return spring 62 imposes elastic force to the second interlock plate 60 so that the front end portion 60b of the second interlock plate 60 is protruded from a sidewall of the movable carriage 10. Accordingly, if applied pressure by a plate surface of the interlock mechanism of the ground switch is removed when the ground switch is at a ground position, then the front end portion 60b of the second interlock plate 60 that has been entered into the movable carriage 10 as illustrated in FIG. 3 is returned to a position protruded from the sidewall of the movable carriage 10 by the elastic force of the return spring 62 as illustrated in FIGS. 1 and 2.

A ground switch interlock apparatus of a vacuum circuit breaker according to a preferred embodiment of the present invention may further include a guide mechanism 61, 60a, 51, 51a, 60c for guiding the movement of the second interlock plate 60.

When moving to the locking position and the position for releasing the restraint, the guide mechanism 61, 60a, 51, 51a, 60c guides the second interlock plate 60 to be horizontally moved in a lateral direction to the left or right side when moving to the locking position or the position for releasing the restraint. The guide mechanism 61, 60a, 51, 51a, 60c comprise a guide protruding portion 61 fixed to the carriage bottom surface 10b of the movable carriage 10 and a guide long hole portion 60a provided on the second interlock plate 60. The guide long hole portion 60a is provided to accommodate the guide protruding portion 61 and restrict the movement of the second interlock plate 60. The guide mechanism 61, 60a, 51, 51a, 60c may further comprise a guide rail 51 for guiding the movement of the first interlock plate 50, an extension plate portion 51a extended from the guide rail 51, and a slide extension portion 60c formed to be extended from the second interlock plate 60 to slide on a surface of the extension plate portion 51a.

Referring to FIGS. 1 through 3, a first supporting plate 42 is separated from the movable plate 40 by a separation distance determined by the spacer pin 46 to a rear side thereof and provided at a rear side of the movable plate 40. The first supporting plate 42 is connected to the movable plate 40 through the spacer pin 46, and thus the first supporting plate 42 is moved together along the movement in a forward or backward direction of the movable plate 40.

A second supporting plate 43 is fixably provided at a further rear side of the first supporting plate 42. For a pair of spring supporting pins 44, the head portion thereof is supported at a front surface of the movable plate 40, and the a rear end portion of the pair of spring supporting pins 44 is extended from the head portion through the movable plate 40 and the first supporting plate 42 to be connected to the head portion. Accordingly, the movable plate 40, first supporting plate 42, and the second supporting plate 43 are connected to one another by a pair of spring supporting pins 44. A return spring 45 is provided on a circumferential surface of the spring supporting pin between the first supporting plate 42 and second supporting plate 43. The return spring 45 elastically bias the movable plate 40 to be located at the manipulation handle connection allowance position.

The operation of a ground switch interlock apparatus of a vacuum circuit breaker having the foregoing construction according to the present invention will be described as follows with respect to FIGS. 1 through 5.

First, it is assumed that the movable carriage 10 is in a drawn-out state to be approached to the girder assembly 1 as illustrated in FIG. 1, and the pressing plate portion 96b of the interlock lever 96 in the interlock operating mechanism 91, 92, 93, 94, 95, 96, 97 is in a state of being separated from the second interlock plate 60 (in a state that the main body of circuit breaker supported by the movable carriage 10 is separated from the terminals of the cradle to be separated from the circuit at this time).

At this time, the first interlock plate 50 releases the second interlock plate 60, and thus if the manipulation handle 70 is inserted and pressed into a connection hole 40a of the movable plate 40, then the movable plate 40 is moved (retracted) to a rear side while the return spring 45 is compressed as illustrated in FIG. 2. As a result, a handle connection end portion of the driving spindle 20 extended to a central handle insertion hole of the second supporting plate 43 is connected to a front end portion 70a of the manipulation handle 70 while the first supporting plate 42 is brought into contact with the second supporting plate 43.

At this time, furthermore, if the manipulation handle 70 is rotatably driven be in one direction, for instance, in a counter-clockwise direction, then the drive spindle 20 is rotated in a counter-clockwise direction and the nut assembly 30 is fixed such that the drive spindle 20 is drawn out to a side of the girder assembly 1, in other words, forward direction. Accordingly, the movable carriage 10 is moved (retracted) in an opposite direction thereof, i.e., in a direction of being apart from the girder assembly 1. Since the direction of being apart from the girder assembly 1 is, in other words, a direction of being approached to a terminal of the cradle connected to the circuit, a terminal of the circuit breaker main body (not shown) is connected to the terminal of the cradle by the retracted movement of the movable carriage 10, and thus it will be a closing possible position capable of electrically connecting a circuit between an electrical power source and an electrical load. Here, the expression of closing possible position is used because the movable contactor and stationary contactor of a vacuum interrupter for each phase in the circuit breaker main body should be in a contacting state in addition to the closing possible position to be a closing state that the power-source and the load of the circuit are electrically connected to each other through a vacuum circuit breaker according to the present invention.

On the other hand, as illustrated in FIG. 3, in a drawn-out state that the movable carriage 10 is approached to the girder assembly 1 (at this time, in a state that the circuit breaker main body supported by the movable carriage 10 is separated from the terminal of the cradle to be separated from the circuit), the operation when driving the ground switch 88 to a ground position may be carried out as follows.

Referring to FIG. 5, if the user operates to rotate the interlock plate operating lever 91 installed to be exposed on a front plate of the ground switch operating panel 80 in a counter-clockwise direction, then the actuating shaft 93 is rotated in a counter-clockwise direction by a counter-clockwise rotational driving torque. Accordingly, the lever plate 94 that has been in the laid state in FIG. 4 pushes a bottom surface 96a of the interlock lever 96 while being rotated in a counter-clockwise direction to the erected state as illustrated in FIG. 5. Accordingly, the interlock lever 96 is also rotated in a counter-clockwise direction around the rotation supporting shaft 97. Along the counter-clockwise rotation of the interlock lever 96, the pressing plate portion 96b provided at an upper portion of the interlock lever 96 presses and pushes the front end portion 60b of the second interlock plate 60 positioned to face each other on the moving path while being laterally moved to the left side in the drawing.

Accordingly, the second interlock plate 60 is moved in a lateral direction, i.e., in a left direction in the drawing while being guided by the guide mechanism 61, 60a, 51, 51a, 60c, i.e., the guide protruding portion 61, the guide long hole portion 60a, the guide rail 51, the extension plate portion 51a, and the slide extension portion 60c.

At this time, the second interlock plate 60 is moved in a lateral direction to the left side only by a length of the guide long hole portion 60a, and by the lateral movement, a end portion of the second interlock plate 60 in the movable carriage 10 lock the first interlock plate 50 which is drawn out to the front side as illustrated in FIG. 1.

Accordingly, the first supporting plate 42 and the second supporting plate 43 are maintained in a state of being separated by a distance d1.

In this state, as illustrated in FIG. 3, even when the manipulation handle 70 is inserted and pressed into the connection hole 40a of the movable plate 40, the latch portion 50a of the first interlock plate 50 is latched by the peripheral portion of the opening 11a in the front plate 11 of the carriage to stop the movement of the first interlock plate 50 in a rear direction, and thus the first supporting plate 42 and the second supporting plate 43 are maintained in a state of being separated by a distance d1.

In this state, even when the manipulation handle 70 is inserted into the connection hole 40a of the movable plate 40, a handle connection end portion of the drive spindle 20 extended to the second supporting plate 43 cannot be connected to the front end portion 70a of the manipulation handle 70. As a result, the rotating operation of the drive spindle 20 cannot be carried out. As the movement of the movable carriage 10 and its supported circuit breaker main body in a rear direction cannot be carried out, the draw-in position manipulation of the vacuum circuit breaker is basically impossible.

Furthermore, referring to FIG. 5, if the user operates to rotate the interlock plate operating lever 91 provided to be exposed to a front plate of the ground switch operating panel 80 in a counter-clockwise direction, then the door plate 92 supported by the interlock plate operating lever 91 is rotated in a counter-clockwise direction to an open position, and thus the handle connection end portion 81a of the ground operating shaft 81 in the front plate of the ground switch operating panel 80 is exposed. At this time, as the manipulation handle is connected to the handle connection end portion 81a to rotatably actuate the ground operating shaft 81, the rotational torque of the ground operating shaft 81 is transferred via the cam 82, the rod 83, the first arm 85, the main shaft 86, and the second arm 87 to rotatably drive the ground switch 88. As a result, the ground switch 88 is brought into contact with a ground portion (not shown), thereby allowing the circuit to be grounded.

As described above, in a ground switch interlock apparatus of a vacuum circuit breaker according to the present invention, it is configured such that the first and the second interlock plate and movable plate are maintained to be located at a position moved to the position for prohibiting the driving and connection of the manipulation handle to prohibit the connection of the manipulation handle when the ground switch is at a ground position, the connection of the manipulation handle with a spindle cannot be carried out when the ground switch is at a ground position, and thus the drawing-in or drawing-out of the circuit breaker main body is basically impossible. As a result, there is provided a ground switch interlock apparatus of a vacuum circuit breaker according to the present invention, thereby obtaining an effect of basically preventing the occurrence of a ground fault.

In a ground switch interlock apparatus of a vacuum circuit breaker according to the present invention, there is provided a return spring for elastically pressing the movable plate to be located at the manipulation handle connection allowance position, thereby obtaining an effect that the movable plate is returned to a position capable of automatically connecting the manipulation handle by the elastic force of the return spring when the ground switch is not at a ground position.

In a ground switch interlock apparatus of a vacuum circuit breaker according to the present invention, there is included a guide mechanism for guiding the second interlock plate to be horizontally moved when moving the first interlock plate to the locking position or the position for releasing the restraint, thereby obtaining an effect that the lock or release of the first interlock plate by the second interlock plate can be correctly and smoothly carried out.

In a ground switch interlock apparatus of a vacuum circuit breaker according to the present invention, the guide mechanism comprises a fixed guide protruding portion and a guide long hole portion provided on the second interlock plate to accommodate the guide protruding portion and restrict the movement of the second interlock plate, thereby obtaining a simple construction that the horizontal movement of the second interlock plate can be guided with a simple construction of the guide protruding portion and the guide long hole portion.

In a ground switch interlock apparatus of a vacuum circuit breaker according to the present invention, the guide mechanism may further comprise a guide rail configured to guide the movement of the first interlock plate, an extension plate portion configured to be extended from the guide rail to a side of the second interlock plate, and a slide extension portion formed to be extended from the second interlock plate to slide on a surface of the extension plate portion, thereby obtaining an effect of smoothly performing the movement of the first interlock plate and the movement of the second interlock plate.

A ground switch interlock apparatus of a vacuum circuit breaker according to the present invention may further comprise a stopper means for restricting the movement of the first interlock plate to a rear side, thereby obtaining an effect of preventing a rear-side end portion of the first interlock plate from obstructing the relevant movement when the second interlock plate is moved to a position of locking the first interlock plate at a ground position of the ground switch.

In a ground switch interlock apparatus of a vacuum circuit breaker according to the present invention, the stopper means may comprise a peripheral portion of an opening into or out of which the first interlock plate is entered on a front plate of the movable carriage and a latch portion extended from the first interlock plate and latched by the peripheral portion of the opening to restrict the movement of the first interlock plate, thereby obtaining an effect of preventing a rear-side end portion of the first interlock plate from obstructing the relevant movement when the second interlock plate is moved to a position of locking the first interlock plate at a ground position of the ground switch, in a simple manner, by forming the latch portion formed at a predetermined length directional position of the first interlock plate having a height higher than that of the opening of the movable carriage.

In a ground switch interlock apparatus of a vacuum circuit breaker according to the present invention, there is further included an interlock operating mechanism capable of moving the second interlock plate to a position of pushing to the position locking the first interlock plate or a position being separated from the second interlock plate, thereby obtaining an effect that the user can manually or motorized drive the interlock operating mechanism to move the second interlock plate to the locking position and the separating position.

In a ground switch interlock apparatus of a vacuum circuit breaker according to the present invention, there is included a operating shaft to be rotated by an motorized or manual driving torque and a power conversion mechanism for converting a rotational torque of the operating shaft to a linear driving force pushing the second interlock plate, thereby obtaining an effect that a rotational torque of the operating shaft is converted to a linear driving force to push the second interlock plate to drive the first interlock plate to be restrained or released.

In a ground switch interlock apparatus of a vacuum circuit breaker according to the present invention, the power conversion mechanism comprise a lever plate supported by the operating shaft to be rotated along the rotation of the operating shaft and an interlock lever positioned within a rotation locus of the rotating lever plate to be pushed and rotated by the rotating lever plate and having a portion being linearly moved along the rotation, thereby obtaining an effect of converting a rotational torque of the operating shaft to a linear driving force with a simple construction of the lever plate and the interlock lever.

In a ground switch interlock apparatus of a vacuum circuit breaker according to the present invention, the interlock operating mechanism further comprise a door plate supported by the operating shaft to be rotated to a position allowing the access of the manipulation handle and a position prohibiting the access of the manipulation handle with respect to the ground operating shaft according to the rotation position of the operating shaft, thereby obtaining an effect that the access of the ground switch manipulation handle is shielded by the door plate to prohibit the ground switch to be driven to a ground position, in a normal operating or maintaining state, such as a position where the circuit breaker main body is drawn in and connected to the circuit to form a closed circuit and supply power from the electric power source to the load or a drawing-out position.

What is claimed is:

1. A ground switch interlock apparatus of a vacuum circuit breaker to be interlocked with ground switches of the vacuum circuit breaker for transferring the rotational torque of a ground operating shaft to drive three-phases ground switches to the ground position at the same time, the apparatus comprising:
    a drive spindle for drawing in or out a main body of the vacuum circuit breaker;
    a movable plate provided with a connection hole of a manipulation handle for rotating the drive spindle to be moved to a manipulation handle connection allowance position for allowing the manipulation handle to be connected to the drive spindle or a manipulation handle connection prohibition position for prohibiting the manipulation handle to be connected to the drive spindle;
    a first interlock plate connected to the movable plate to be movable to move the movable plate to the manipulation handle connection allowance position or the manipulation handle connection prohibition position; and
    a second interlock plate to be movable to a lock position for locking the first interlock plate at the manipulation handle connection prohibition position or a releasing position for releasing the first interlock plate.

2. The apparatus of claim 1, further comprising:
    a return spring configured to elastically bias the movable plate to be located at the manipulation handle connection allowance position.

3. The apparatus of claim 1, further comprising:
    a guide mechanism configured to guide the second interlock plate to be horizontally moved when moving to the locking position or the releasing position.

4. The apparatus of claim 3, wherein the guide mechanism comprises:
    a fixed guide protruding portion; and
    a guide long hole portion provided on the second interlock plate to accommodate the guide protruding portion and restrict the movement of the second interlock plate.

5. The apparatus of claim 4, wherein the guide mechanism further comprises:
    a guide rail configured to guide the movement of the first interlock plate;
    an extension plate portion configured to be extended from the guide rail; and
    a slide extension portion formed to be extended from the second interlock plate to slide on a surface of the extension plate portion.

6. The apparatus of claim 1, further comprising:
    a stopper means for restricting the movement of the first interlock plate to a rear side.

7. The apparatus of claim 6, wherein the stopper means comprises:
    a peripheral portion of an opening into or out of which the first interlock plate is entered on a front plate of a movable carriage that supports the main body of the vacuum circuit breaker to be transferred to a drawing-in position or drawing-out position; and
    a latch portion formed to be extended from the first interlock plate and latched by the peripheral portion of the opening to restrict the movement of the first interlock plate.

8. The apparatus of claim 1, further comprising:
    an interlock operating mechanism configured to be move the second interlock plate to a position of pushing to the position locking the first interlock plate or a position being separated from the second interlock plate.

9. The apparatus of claim 8, wherein the interlock operating mechanism comprises:
    a operating shaft to be rotated by a motorized or manual driving torque; and
    a power conversion mechanism connected to and driven by the operating shaft to convert a rotational torque of the operating shaft to a linear driving force for pushing the second interlock plate.

10. The apparatus of claim 9, wherein the power conversion mechanism comprises:
    a lever plate supported by the operating shaft to be rotated along the rotation of the operating shaft; and
    an interlock lever positioned within a rotation locus of the rotating lever plate to be pushed and rotated by the rotating lever plate, and having a portion being laterally moved along the rotation.

11. The apparatus of claim 9, wherein the interlock operating mechanism further comprises:
    a door plate supported by the operating shaft to be rotatable to a position allowing the access of the manipulation handle or a position prohibiting the access of the manipulation handle with respect to the ground operating shaft according to the rotation position of the driving shaft.

* * * * *